US 6,681,638 B2

(12) United States Patent
Kazerooni et al.

(10) Patent No.: US 6,681,638 B2
(45) Date of Patent: Jan. 27, 2004

(54) DEVICE AND METHOD FOR WIRELESS MATERIAL HANDLING SYSTEMS

(75) Inventors: Homayoon Kazerooni, 2806 Ashby Ave., Berkeley, CA (US) 94720; Dylan Miller Fairbanks, Crockett, CA (US); Albert Chen, Columbia, MD (US); Gene Shin, Santa Clara, CA (US)

(73) Assignee: Homayoon Kazerooni, Berkeley, CA (US)

( * ) Notice: Subject to any disclaimer, the term of this patent is extended or adjusted under 35 U.S.C. 154(b) by 0 days.

(21) Appl. No.: 10/101,157

(22) Filed: Mar. 20, 2002

(65) Prior Publication Data

US 2002/0178830 A1 Dec. 5, 2002

Related U.S. Application Data

(60) Provisional application No. 60/288,628, filed on May 4, 2001.

(51) Int. Cl.[7] ................................. B66D 1/48
(52) U.S. Cl. .................... 73/760; 254/270; 254/266
(58) Field of Search .............. 73/760, 379.01, 73/379.04; 414/5, 2; 704/270; 702/150; 254/270, 266, 274

(56) References Cited

U.S. PATENT DOCUMENTS

| | | |
|---|---|---|
| 2,940,608 A | 6/1960 | Underwood |
| 3,385,350 A | 5/1968 | Powell |
| 3,921,959 A | 11/1975 | Ulbing |
| 3,940,110 A | 2/1976 | Motoda |
| 4,055,905 A | 11/1977 | Budrose |
| 4,414,537 A | 11/1983 | Grimes |
| 4,444,205 A | 4/1984 | Jackson |
| 4,488,726 A | 12/1984 | Murray |
| 4,542,291 A | 9/1985 | Zimmerman |
| 4,557,659 A | 12/1985 | Scaglia |
| 4,613,139 A | 9/1986 | Robinson |
| 4,715,235 A | 12/1987 | Fukui et al. |
| 4,917,360 A | 4/1990 | Kojima |
| 4,986,280 A | 1/1991 | Marcus et al. |
| 5,047,952 A | 9/1991 | Kramer et al. |
| 5,143,505 A | 9/1992 | Burdea et al. |
| 5,184,319 A | 2/1993 | Kramer |
| 5,316,017 A | 5/1994 | Edwards et al. |
| 5,358,219 A | 9/1994 | Shenk et al. |
| 5,449,002 A | 9/1995 | Goldman |
| 5,480,125 A | 1/1996 | Bitsh et al. |
| 5,551,308 A | 9/1996 | Arai et al. |
| 5,581,484 A | 12/1996 | Prince |
| 5,662,123 A | 9/1997 | Goldman |
| 5,669,809 A | 9/1997 | Townsend |

(List continued on next page.)

OTHER PUBLICATIONS

U.S. patent application Ser. No. 09/443,278, Kazerooni.
"A Case Study on Dynamics of Haptic Devices: Human Induced Instability in Powered Hand Controllers" Tanyia Snyder and H. Kazerooni, AIAA Journal of Guidance, Control and Dynamics, vol. 18, No. 1, 1995, pp. 108–113.
"Human Power Extnder", H. Kazerooni, J, Guo, ASME Journal of Dynamic Systems, Measurements and Control, vol. 115, No. 2(B), Jun. 1993, pp. 281–289.

*Primary Examiner*—Andrew H. Hirshfeld
*Assistant Examiner*—Marissa Ferguson

(57) ABSTRACT

The invention provides a device and method for wireless material handling systems. The invention further provides an instrumented glove device worn by an operator. A sensory system within the glove device measures the contact force the operator is exerting on either an object to be moved or the material handling system and generates a set of contact signals representing the contact force. The contact signals are transmitted, via a transmitter circuitry, to a controller in another location. The controller receives and processes the signals and generates a set of command signals. The command signals control the speed and mechanical assistance required of an actuator, as a function of the operator contact force, to move the material handling system.

39 Claims, 15 Drawing Sheets

U.S. PATENT DOCUMENTS

| | | |
|---|---|---|
| 5,681,993 A | 10/1997 | Heitman |
| 5,723,786 A | 3/1998 | Klapman |
| 5,775,332 A | 7/1998 | Goldman |
| 5,796,354 A | 8/1998 | Cartabiano et al. |
| 5,850,928 A | 12/1998 | Kahlman et al. |
| 5,865,426 A | 2/1999 | Kazerooni |
| 5,915,673 A | 6/1999 | Kazerooni |
| 6,016,103 A | 1/2000 | Leavitt |
| 6,032,530 A | 3/2000 | Hock |
| 6,033,370 A | 3/2000 | Reinbold et al. |
| 6,035,274 A | 3/2000 | Kramer et al. |
| 6,126,572 A | 10/2000 | Smith |
| 6,241,462 B1 | 6/2001 | Wannasuphoprasit et al. |
| 6,299,139 B1 | 10/2001 | Kazerooni |

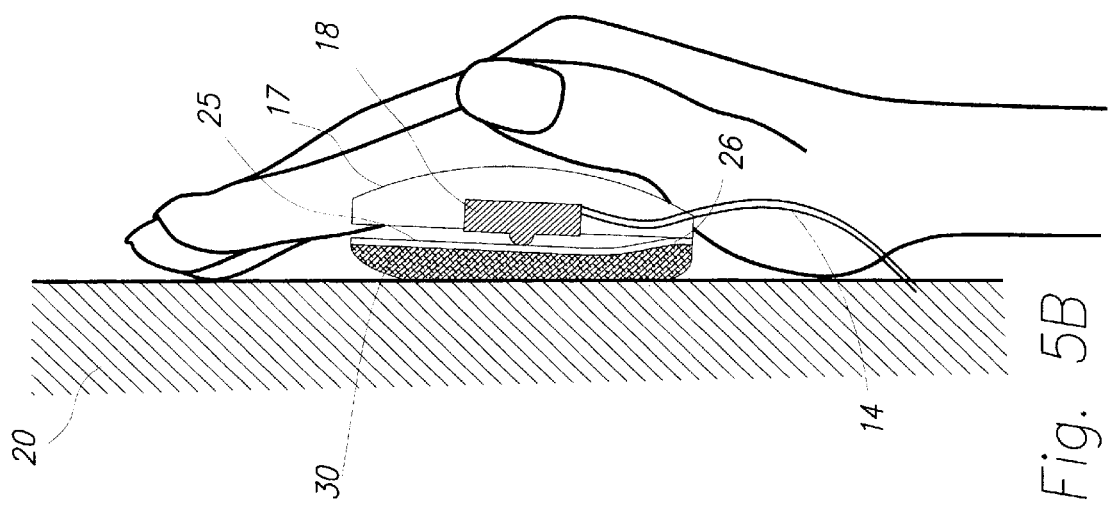
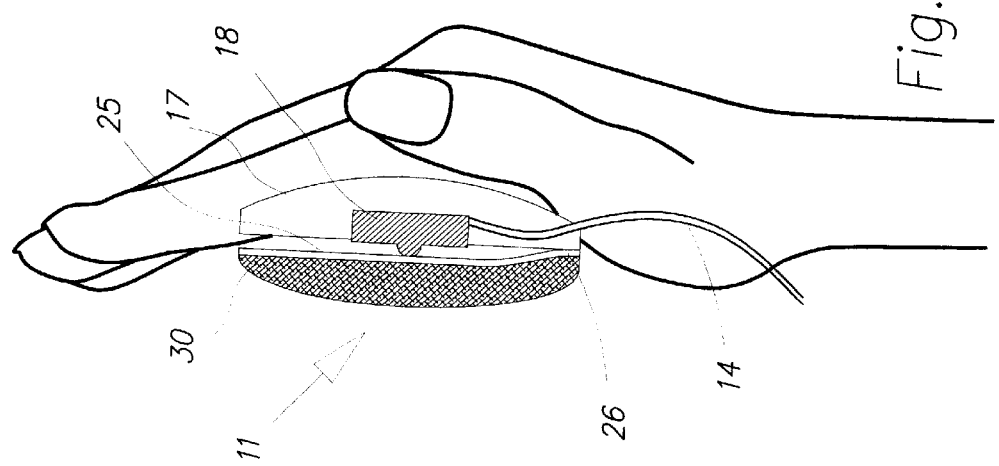
Fig. 5A
Fig. 5B

DEVICE AND METHOD FOR WIRELESS MATERIAL HANDLING SYSTEMS

REFERENCE TO RELATED APPLICATIONS

This application claims priority to U.S. Provisional Application No. 60/288,628, filed May 4, 2001.

GOVERNMENT SUPPORT

This work was supported in part by grants from NSF, grant numbers DMI-9713376. The government may have certain rights in this invention.

FIELD OF THE INVENTION

This invention relates to material handling devices. More specifically, this invention is a material handling device that, among other components, includes an instrumented glove worn by an operator and measures the force the operator is imposing on an object and transmits the measured force in a manner to move the object.

BACKGROUND OF THE INVENTION

Current material handling devices, e.g., U.S. Pat. Nos. 5,915,673 and 5,865,426 (Kazerooni), include a sensory end-effector held by a human operator, wherein the human operator force on the material handling device is then amplified electronically to drive the manual material handling device. The sensory end-effector that measures the human operator force is physically connected to the material handling device. A signal, representing the human force imposed on the end-effector by the human operator is measured by the force sensor in the end-effector and transmitted to a controller which controls the actuators of the material handling device. The controller causes the material handling device to move the end-effector and load appropriately so that only a pre-programmed small proportion of the load force is supported by the human operator and the remaining force is provided by the actuators of the material handling system.

Accordingly, the critical element of the cited prior art is the end-effector. The material handling device of the prior art responds only to the measured force from a force sensor in the end-effector. Thus, the material handling device is moved only by operator contact with the end-effector; it is not moved by operator contact with the load or any other part of the material handling device. The material handling device of this invention does not have any sensory end-effector and allows the operator to move the load by pushing onto any point on the load or onto any point on the material handling system itself. The material handling system of this invention includes an instrumented glove that is always worn by the operator and therefore remains with the operator. The instrumented glove of this invention generates a set of contact signals as a function of the contact force between the glove and the object being manipulated or the material handling device itself. A set of control signals representing the contact force is transmitted in the form of RF signals to a controller so that a command signal is generated. The command signal is sent to an actuator to provide the required assistance to maneuver the material handling device as a function of the force imposed by the operator, so that the operator provides only a small portion of the total force needed to maneuver the material handling device and the object being manipulated by the material handling device.

Instrumented glove is an important component of the invention described here. Currently, instrumented gloves are used in various applications. For instance, gloves with actuators that create forces on the fingers according to a set of computer instructions are designed to emulate forces on the wearer's fingers and thumbs in telerobotics and virtual reality applications. U.S. Pat. No. 5,184,319 (Kramer) and U.S. Pat. No. 5,143,505 (Burdea et al.) are patents teaching examples of this application of instrumented gloves.

Another type of instrumented glove device includes sensors that measure kinematics type data (i.e., position, orientation, and posture) of the fingers, thumbs and wrists for various applications. Applications for gloves with embedded sensors measuring kinematics type data include for example: transforming human hand movements into electronic letters and characters, controlling the movement and actions of video characters, providing biofeedback for sports training such as tennis and golf, and assessing the mobility of human and/or animal joints. Examples of transforming human hand movements into electronic letters and characters are taught by, for example, U.S. Pat. No. 4,414,537 (Grimes) and U.S. Pat. Nos. 5,047,952 and 6,035,274 (Kramer et al.). Examples of controlling the movement and actions of video characters are found in the inventions taught by U.S. Pat. No. 5,796,354 (Cartabiano et al.) and U.S. Pat. No. 4,613,139 (Robinson II). U.S. Pat. No. 6,032,530 (Hock) teaches a method and an apparatus with sensors to measure body movement and flexure during kinetic activities. U.S. Pat. No. 4,542,291 (Zimmerman), teaches an optical flex sensor that can be used to detect bending of human movements. U.S. Pat. No. 4,715,235 (Fukui) teaches an electro conductive woven or knitted fabric, which changes its electrical characteristics when stretched and can be used as a switch. And finally, examples of assessing the mobility of human and/or animal joints are taught by, for example, U.S. Pat. No. 4,444,205 (Jackson) and U.S. Pat. No. 4,986,280 (Marcus et al.).

A third type of instrumented glove in the prior art includes glove devices with some sort of sensors to measure the interaction with other objects. Examples include the inventions taught by U.S. Pat. No. 5,581,484 (Prince) describing an apparatus for manually entering information into a computer by generating a virtual keyboard, mouse, graphics tablet or other forms of input data, and U.S. Pat. No. 4,055,905 (Budrose) describing a system that facilitates learning to type. Gloves with sensors to measure the interaction with other objects also include safety and sports training applications, such as taught by, for example, U.S. Pat. No. 6,016,103 (Leavitt) describing a glove to detect whether or not a motor vehicle driver is sleeping, and U.S. Pat. No. 5,669,809 (Townsend) describing a safety glove to be used in conjunction with a cutting machine, U.S. Pat. No. 5,681,993 (Heitman) and U.S. Pat. No. 4,488,726 (Murray) describing gloves for monitoring human gripping force on a golf club or on an aircraft control stick. Similarly, U.S. Pat. No. 6,126,572 (Smith) describes an apparatus for monitoring and displaying information related to pressure exerted at a point of interest during an isometric exercise, and U.S. Pat. No. 5,723,786 (Klapman) describes a boxing glove capable of measuring impact forces. And finally, U.S. Pat. Nos. 5,662,123, 5,449,002, 5,775,332 (Goldman et al.) and U.S. Pat. No. 6,033,370, (Reinbold et al.) describe capacitive sensor which has a plurality of layers forming a force detector which can be embedded in various patients' shoe, boot, ankle, brace, crutch and handgrip to provide biofeedback to help patients relearn function or prevent atrophy.

Thus, prior to the present invention a need remained in the art for a simpler, more versatile device for maneuvering a manual material handling system that requires very little force from the operator and, wherein the operator directs the maneuvering of the material handling device to move an object, by pushing on any point on the material handling device or pushing on the object being maneuvered. Moreover, a system is also further needed to provide assistance for maneuvering the material handling device proportionally based on the force imposed by the operator, so that the operator provides only a small portion of the total force needed to maneuver the material handling device. Nevertheless, no prior art instrumented glove type device is designed for assisting manual material handling systems.

SUMMARY OF THE INVENTION

The present invention describes a material handling device for maneuvering at least one object, among other components, comprising: at least one actuator to cause the material handling device to move; an instrumented glove wearable by a human hand, wherein the instrumented glove detects a contact force imposed by the wearer on the object or a part of the material handling device and generates a set of contact signals representing the contact force; at least one transmitter circuitry capable of transmitting a set of control signals representing the contact signals to other locations; and a controller to receive and process the control signals and to generate command signals to control the actuator to cause the material handling device to move.

Additional objects, advantages and novel features of the invention will be set forth in part in the description and figures which follow, and in part will become apparent to those skilled in the art on examination of the following, or may be learned by practice of the invention.

DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown.

FIGS. 5A and 5B illustrate the sensory system of the embodiment of the instrumented glove of FIG. 1 with the glove removed.

FIG. 5A shows the sensory system alone and

FIG. 5B shows the sensory system in use.

DESCRIPTION OF PREFERRED EMBODIMENTS OF THE INVENTION

Figure 1:
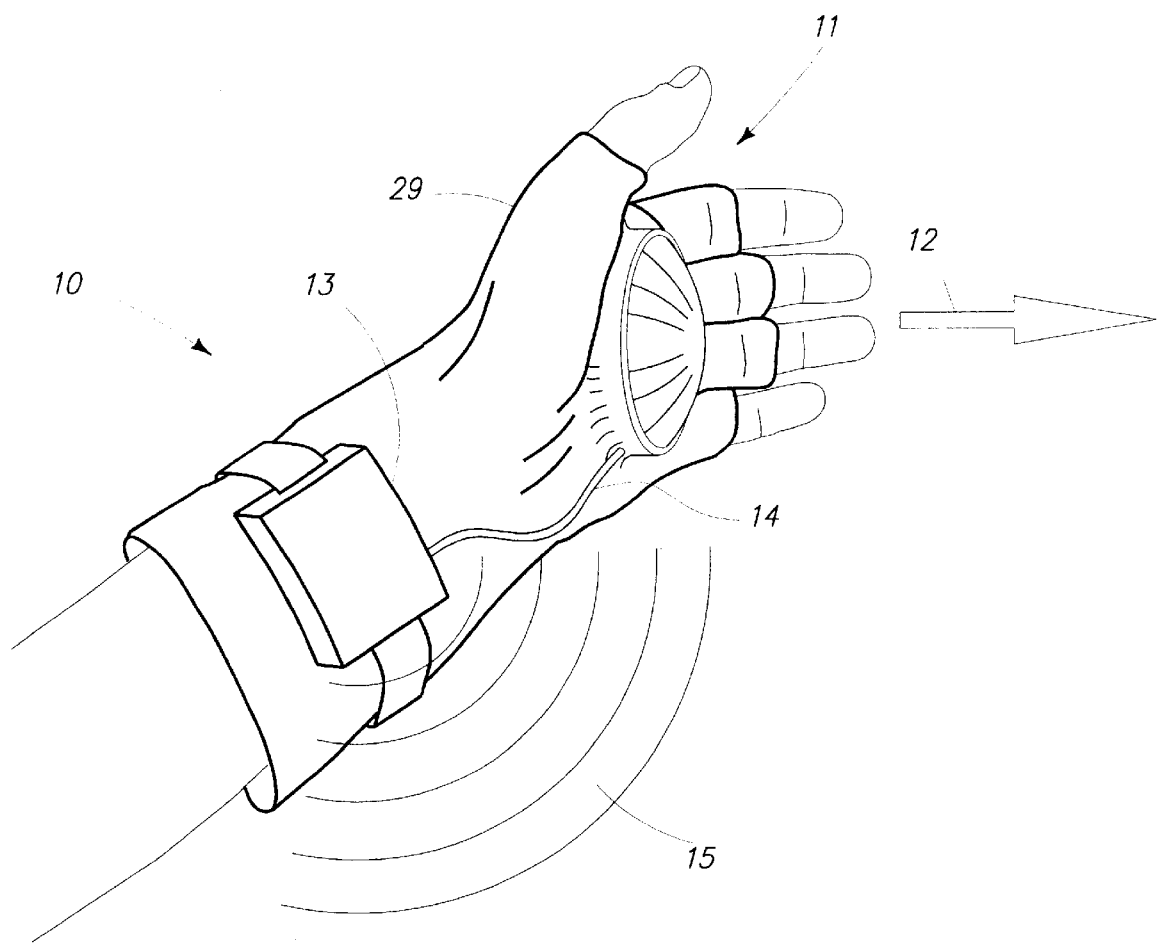
FIG. 1 is an isometric view of a preferred embodiment of the instrumented glove of the present invention.

The description contained herein relates to a device and method for a material handling system comprising an instrumented glove, a controller and an actuator, that measures the force imposed by wearer of the instrumented glove on the material handling system or an object being manipulated, and provides the required assistance so that the operator provides only a small portion of the total force needed to maneuver the material handling system. This description, however, is intended to be illustrative only and not limiting as to the scope of the present invention. Referring now to the drawings, the details of embodiments of the invention are graphically and schematically illustrated. Like elements in the drawings may be represented by like numbers.

FIG. 1 shows an exemplary embodiment of the instrumented glove 10 which is worn on the human operator's hand. Instrumented glove 10 consists of a leather (or cloth) glove 29 with an embedded sensory system 11. Embedded sensory system 11 measures the compressive force exerted by the human operator on an object. Arrow 12 represents the direction of the compressive force that can be measured by instrumented glove 10. A contact signal, representing the compressive force, is sent to a transmitter circuitry 13 via a signal cable 14. Transmitter circuitry 13 transmits a set of control signals (in terms of RF waves 15), representing the contact signal, to a receiver circuitry 16 installed in another location. (Receiver circuitry 16 is not shown in FIG. 1). The received radio frequency waves that are functions of the measured operator force are then used to control other devices. In particular if the instrumented glove measures the operator force on a material handling device or an object being manipulated by the material handling device, the received RF waves can be used to control the material handling device.

Although FIG. 1 shows the instrumented glove on the wearer's left hand, it should be apparent to one skilled in the art that the instrumented glove of the present invention is applicable to either hand. Also note that the instrumented glove described here is not confined to represent ordinary wearable gloves instrumented with force sensors. The terminology "instrumented glove" is used here to encompass all kinds of gloves, hand pieces, palm, hand and finger covering devices, brace type devices or any type of device that can be connectable and wearable by human hand and measures the human force imposed on an object and transmits RF signals (RF waves) representing the measured force to a receiver located in another location.

The term Radio Frequency (RF) refers to the electromagnetic field that is generated when an alternating current is input to an antenna. RF radiation, can be used for wireless broadcasting and communications over a significant portion of the electromagnetic radiation spectrum—from about 3 kilohertz (kHz) to thousands of gigahertz (GHz). Usually Microwave (MW) radiation is considered a subset of RF radiation, although an alternative convention treats RF and MW radiation as two spectral regions. Microwaves occupy the spectral region between 100 MHz and 300 GHz. As the frequency is increased beyond the RF spectrum, electromagnetic energy takes the form of infrared (IR), visible light, ultraviolet (UV), X rays, and gamma rays. Many types of wireless devices make use of RF fields—radio, television, cordless and cellular telephones, satellite communication systems, and many measuring and instrumentation systems used in manufacturing.

RF waves (some times referred to as RF signals) have different frequencies, and by tuning a radio receiver to a specific frequency one can pick up a specific signal. In the U.S. the FCC (Federal Communications Commission) decides who is able to use what frequencies for what purposes, and it issues licenses to stations for specific frequencies. All FM radio stations transmit in a band of frequencies between 88 megahertz and 108 megahertz. This band of the radio spectrum is used for no other purpose but FM radio broadcasts. In the same way, AM radio is confined to a band from 535 kilohertz to 1,700 kilohertz. Other common frequency bands include the following:

Television stations: 54–88 megahertz for channels 2–6

Television stations: 174–220 megahertz for channels 7–13

Garage door openers, alarm systems, etc.: around 40 megahertz

Standard cordless phones: Bands from 40 to 50 megahertz

Baby monitors: 49 megahertz

Radio controlled airplanes: around 72 megahertz

Cell phones: 824 to 849 megahertz

New 900 MHz cordless phones: Obviously around 900 megahertz!

For exemplary purposes, a particular application of the present invention is first described. The mechanical and electrical components of the wireless material handling system including the instrumented glove, wireless communication architecture, and control method are then described.

A particularly appropriate application for the present invention is the cable car system still in use today in San Francisco, Calif. Cable cars have been used in San Francisco as a transportation means for many years. The principle of the San Francisco cable car operation is simple. Underneath the streets where the cable cars run, a continuously moving cable is pulled in a powerhouse by an electric actuator. Slots in the street, located between the rails on which the cable cars run, provide access to the continuously moving cable. Each cable car is equipped with a grip, which is essentially a strong pair of pliers that extends through the slot to the continuously moving cable. To move the cable car, the conductor pulls a lever inside the cable car, which tightens a grip on the cable and the cable car moves with the continuously moving cable. To stop the cable car, the conductor releases the grip and applies the brakes. The San Francisco cable car system also has several rotating stations. At these rotating stations, the cable cars are placed on large turntables that rotate the cable car so that the cable car is directed back in the opposite direction on the same route.

Figure 2:
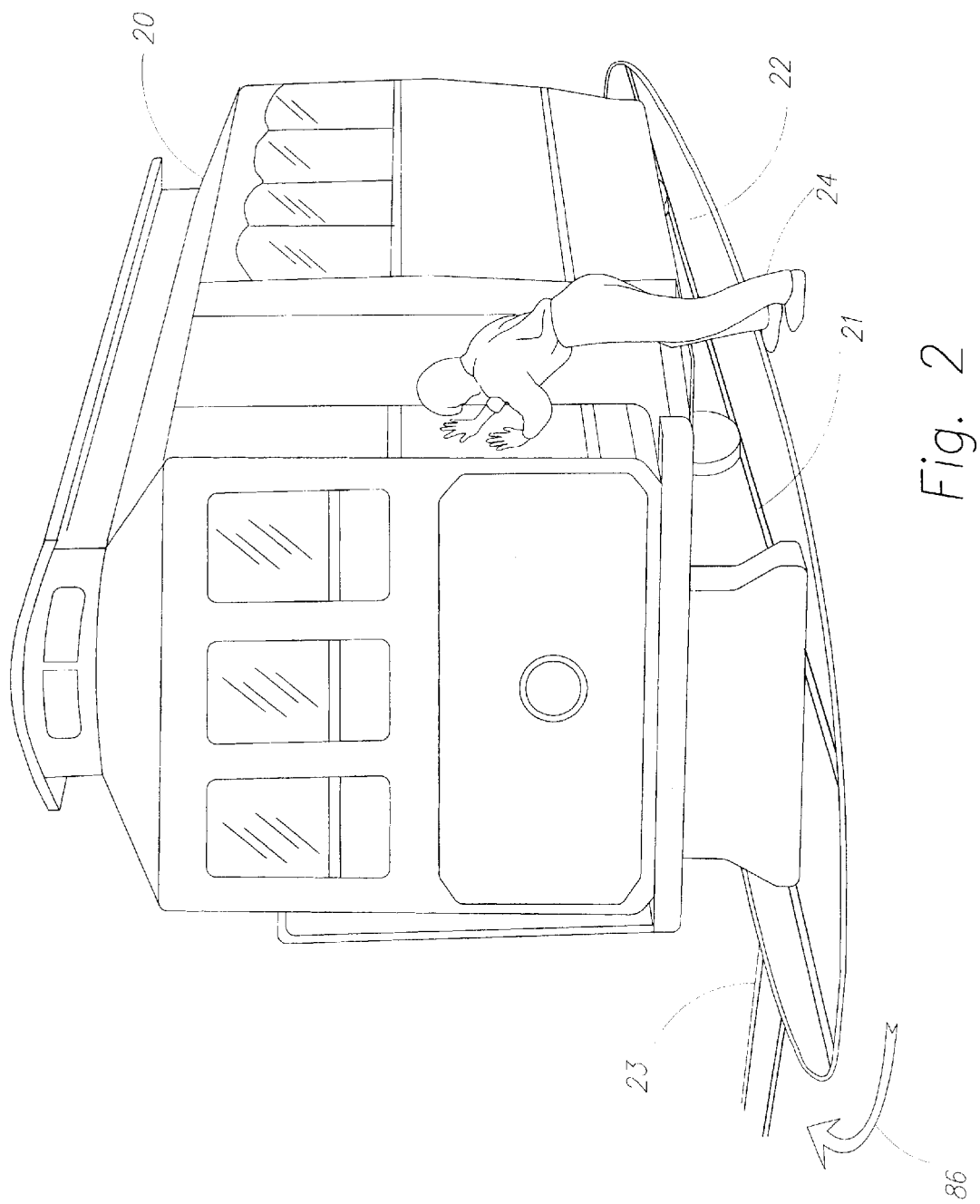
FIG. 2 illustrates a cable car being rotated at a rotating station by operator force only.

FIG. 2 shows a rotating station used to rotate cable car 20. Cable car 20 is first driven onto a set of rails 21 that are installed on turntable 22. After engaging the cable car's brakes, turntable 22 is rotated by an operator 24 until rails 21 are aligned with a set of rails 23 mounted outside of turntable 22. Arrow 86 shows the direction of the turntable's rotation. After alignment of the rails, the cable car brakes are disengaged and cable car 20 is driven out of turntable 22 onto street rails 23. This rotation process allows cable car 20 to change orientation so that it can go in the opposite direction on the same rails.

Figure 3:
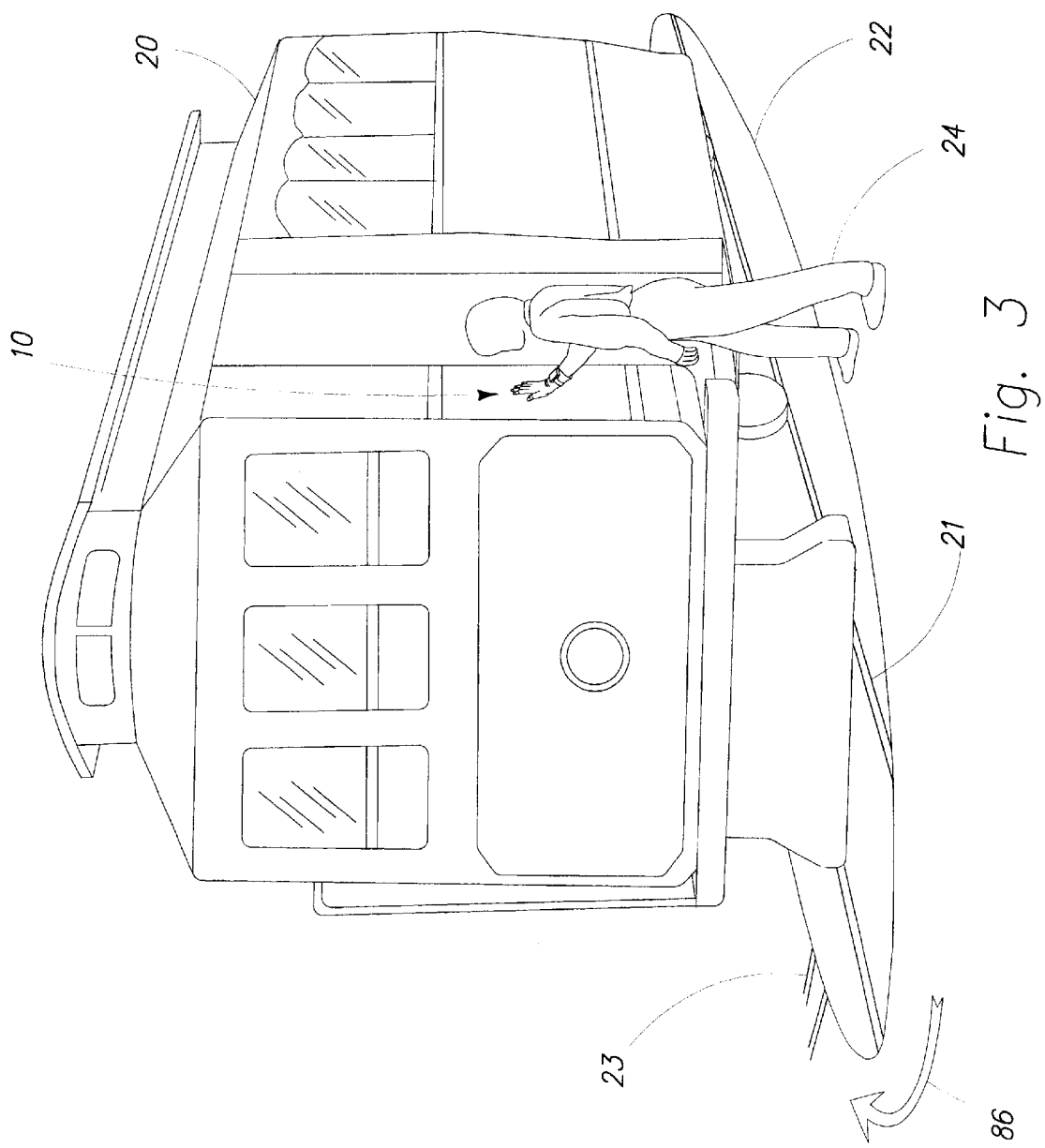
FIG. 3 illustrates a cable car being rotated at a rotating station utilizing the instrumented glove of the present invention where the strenuous efforts required by the operator are significantly decreased.
Figure 4:
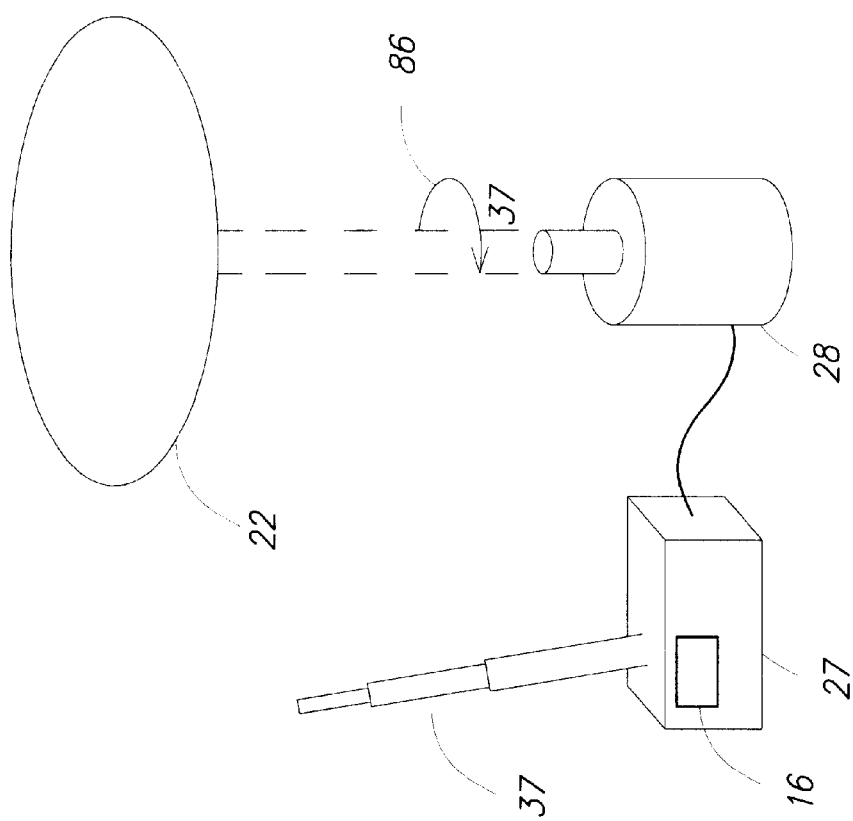
FIG. 4 is a schematic view of the operation of the present invention.
Figure 4:
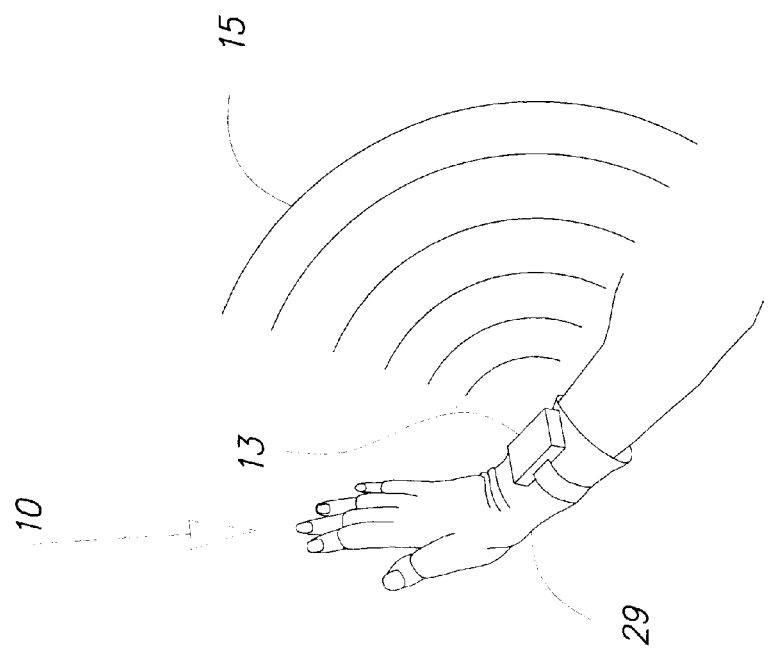

The turntables of San Francisco are not powered, and therefore, need to be rotated manually by one or two operators. The manual rotation of the San Francisco turntables gives a charming flavor of an older era and attracts millions of tourists. At each rotating station, hundreds of people wait to see the manual rotation of the cable cars by operators. For this reason, it is undesirable to power and automate these turntables. However, although amusing and attractive for passengers and viewers, the manual rotation of the San Francisco cable cars is painful for cable car operators who have to push the cable cars to rotate them. The large forces required to turn the cable car and the turntable have caused cable car operators a great deal of repetitive injuries. Thus, the present invention is ideally suited for this situation. Electric actuators installed under the turntables power the turntables. However, the authenticity of the San Francisco turntables is maintained since no intermediary devices such as, push-buttons, keyboards, or switches are used to operate the actuators. As shown in FIG. 3, where operator 24 is pushing against cable car 20 using the instrumented glove 10 of the present invention, the strenuous efforts required by the operator are significantly decreased. Instrumented glove 10 measures the force operator 24 imposes on cable car 20 and generates contact signals representing the operator force. The contact signals are converted to command signals, which control the actuator used to turn the turntable. FIG. 4 schematically shows the details of the wireless communication and how the information associated with the operator force is used.

As shown on FIG. 4, turntable 22 is rotated by actuator 28. One of ordinary skill in the art would know there are various ways of constructing actuator 28 and connecting it to turntable 22. For example an electric motor could be used in conjunction with a transmission speed reducer to power and rotate turntable 22. In locations that electric power is not available, one can use hydraulic or pneumatic actuators. In some simple instances actuator 28 could include a simple clutch that releases energy for rotation of the table. Transmitter circuitry 13 receives the generated contact signals and transmits a set of control signals via RF waves 15 through a transmitting antenna (not shown in FIG. 4). Turntable controller 27 located either under the turntable or next to the turntable, receives RF waves 15 via a receiving antenna 37. Receiver circuitry 16 (located in turntable controller 27) receives RF waves 15 which represent the operator force. Receiver circuitry 16 generates a set of data as a function of the received RF waves 15. Using the data generated by receiver circuitry 16, turntable controller 27 calculates an appropriate speed for actuator 28 that turns turntable 22. This calculated appropriate speed provides enough mechanical strength to assist the operator in the rotating task as required, so that, when operator 24 pushes on cable car 20, turntable 22 rotates, wherein the operator exerts only a small portion of the total force needed to rotate the turntable. All of this happens so quickly that the operator's pushing and the turntable turning appear synchronized perfectly.

Additionally, since instrumented glove 10 is worn by the operator, the operator can push cable car 20 by exerting force on any point on the cable car. In this way, the instrumented glove of the present invention replaces intermediary devices such as push buttons, keyboards, and switches to operate turntable 22. Similarly, to an observer, the method seems manual since operator 24 is involved in the turning process and actuator 28 that rotates turntable 22 is under turntable 22 and cannot be seen.

Thus, the method and device of the present invention including instrumented glove 10, controller 27, and actuator 28, create an assisting system for manual operation of the turntable without any modification to the appearance of the manual operation. This assisting system also reduces the force operator 24 needs to apply to rotate turntable 22 since actuator 28 generates most of the torque required to rotate the turntable. This reduction in force leads to less fatigue and less risk of injuries for the cable car operators. In general, an instrumented glove in conjunction with a controller and an actuator, as described above, can be used as an assist device to help workers push against various objects and move them with little force in various manufacturing and industrial environments.

The details of a preferred embodiment of instrumented glove 10, where glove 29 is removed for clarity, are shown FIGS. 5A and 5B. Sensory system 11, which is embedded in glove 29 measures the operator's forces on the environment. Sensory system 11 comprises a base platform 17 connected (either glued or sewn) to the palm of glove 29. Force sensing device 18 is connected to platform 17 by means of fasteners (not shown in FIGS. 5A and 5B). Force sensing device 18 can be any kind of sensor that measures the operator force. We have used a strain gage based force sensing device. A strain gage based force sensor includes resistors that are bonded to the material of the force sensor. The force on the force sensor will give rise to the force sensor strain which causes a change in the active length of the resistors and hence their electrical resistance. This change in the electrical resistance of the resistors can then be transformed into a change in voltage via an electric circuitry. The produced voltage is proportional with the applied force. There are a great number of strain gage based sensors in the market. Entran is an example of a company that has been manufacturing variety of strain gage sensors for many years. In should be apparent to one skilled in the art that there are alternative force sensing devices which take advantage of the changes in other electrical properties (e.g. capacitance and inductance) as a function of the applied force. A thin plate 25 is connected to base platform 17 at point 26. The top of thin plate 25 is covered with soft material 30, e.g., rubber. As operator 24, wearing glove 29, pushes against cable car 20 (shown in FIG. 5B), force sensing device 18 measures the contact force and generates contact signals representing the force. The contact signals from force sensing device 18 are then transmitted to transmitter circuitry 13 which transmits a set of RF waves representing the contact signals to another location for processing and control. Transmitter circuitry 13, shown in FIG. 1 and FIG. 4, is worn by operator 24 like a watch and receives contact signals via signal cable 14. In should be apparent to one skilled in the art that there are alternative locations for the transmitter circuitry, e.g., operator 24 can wear transmitter circuitry 13 on his belt.

Figure 6:
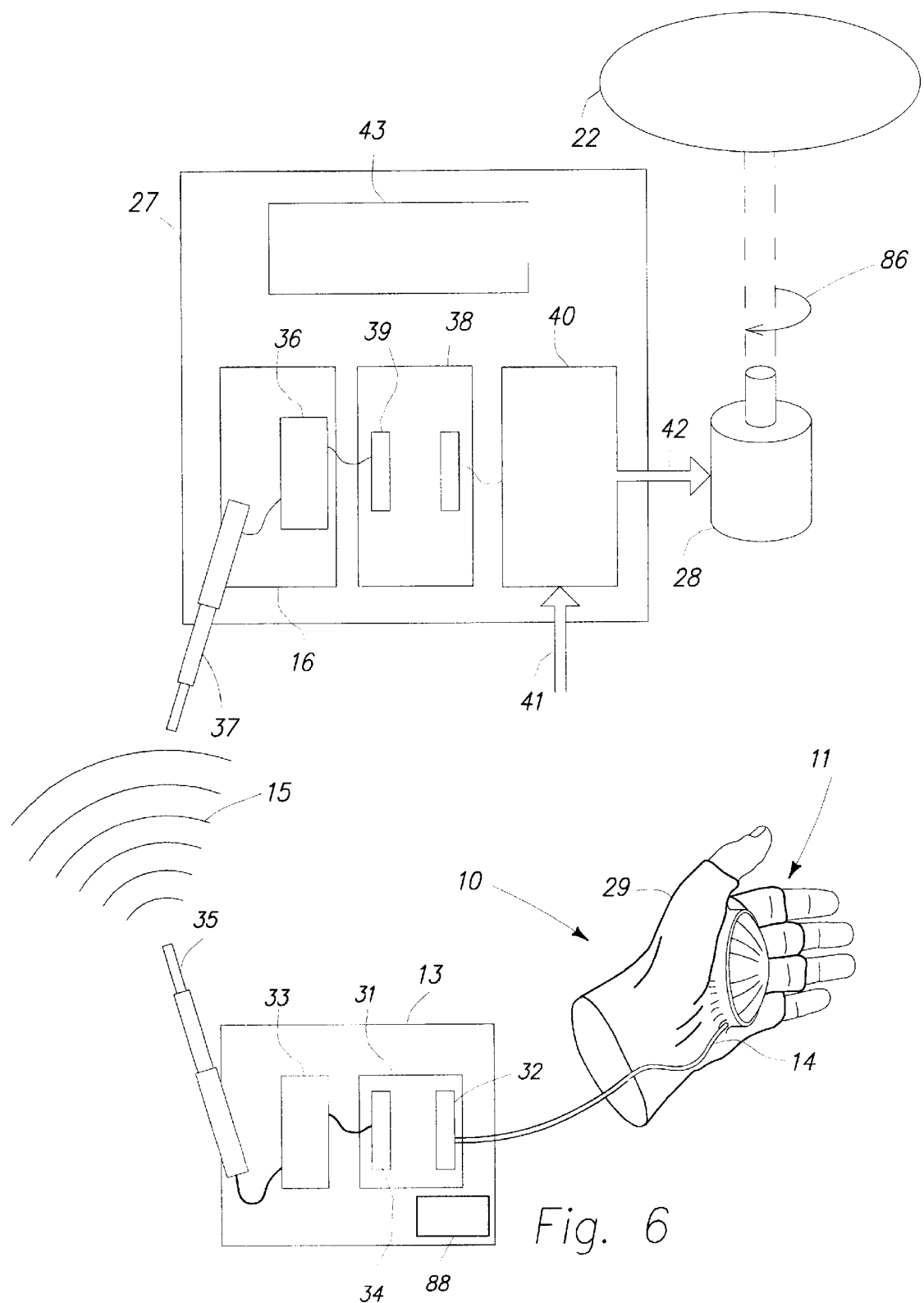
FIG. 6 is a schematic of the wireless data transfer between the instrumented glove and a turntable controller.

FIG. 6 schematically illustrates the wireless data exchange between transmitter circuitry 13 (integrated with the instrumented glove 10 or attached to operator 24) and receiver circuitry 16 (integrated in turntable controller 27). The transmitter circuitry comprises a micro-controller 31, a transmitter module 33, and a transmitting antenna 35. An 8-bit micro-controller manufactured by Motorola (Motorola part no. MC68HC705B16CFN) was used in the exemplary embodiment of the present invention. This particular micro-controller is the most widely used general-purpose 8-bit micro-controller in the US. As would be apparent to those skilled in the art, various alternatives are available, e.g., the TMS320C240 (16 bit digital signal processor) manufactured by Texas Instrument.

The contact signals from sensory system 11 (part of instrumented glove 10) are first read by analog to digital converter (ADC) 32 of micro-controller 31 and then collected into the micro-controller's memory. Micro-controller 31 generates a set of information signals as a function of the collected contact signals. This set of information signals, generated in micro-controller 31 is then passed to RF transmitter module 33 one bit at a time (serial streams) using Serial Communications Interface (SCI) 34 located in micro-controller 31. The individual bits sent to RF transmitter module 33 are synchronized to create the desired baud rate. Transmitter module 33 used in the exemplary embodiment of the present invention has a maximum data transfer rate of 50 kbps (kilobauds per second), and therefore dictates the maximum rate at which micro-controller 31 can feed RF transmitter module 33. The available baud rate closest to this maximum is 41,667 bps, and is the rate selected.

Transmitter module 33 used in the exemplary embodiment of the present invention is the HP Series-II transmitter manufactured by Linx Technologies (Linx Technologies part no. TXM-900-HP-II). The HP Series-II operates in the 902–928 MHz band, and offers simplified integration into wireless product designs. Other features of transmitter module 33 are 8 selectable channels and the ability to transmit either analog or digital data.

Transmitting antenna 35 in transmitter circuitry 13 functions as a coupling device that allows for transmission of a set of RF waves 15 as a function of the information signals collected by transmitter module 33. Note that RF waves 15, transmitted in the air through transmitting antenna 35 represent the contact signals or the operator contact force and can easily be collected by any receiving antenna. For the exemplary embodiment, the transmitting antenna used is the flat "Splatch" antenna, manufactured by Linx Technologies (Linx part no. ANT-916-SP). The compactness of this transmitting antenna 35 allows it to be concealed within the enclosure of transmitter circuitry 13, which makes it better suited for portable devices. An alternative is a "whip" style antenna, which would afford somewhat better performance, but would make the transmitter unit more cumbersome. Additional alternatives for the transmitting antenna 35 would be apparent to one skilled in the art. A battery 88 with proper voltage and current limit is also included in transmitter circuitry 13 to power all components of the transmitter circuitry 13 and embedded sensory system 11.

Turntable controller 27 comprises four major components: a receiver circuitry 16, a computer 38, a power amplifier 40, and a logic circuit 43. Receiver circuitry 16 includes an RF receiver module 36 and a receiving antenna 37. Receiver module 36 receives RF waves 15 through receiving antenna 37 for use by other parts of turntable controller 27. After detecting, filtering, and amplifying the transmitted RF waves, receiver module 36 makes a set of data available to computer 38 through the Serial Communications Interface (SCI) 39 feature of computer 38. Receiver module 36 (e.g., Linx Technologies part no. RXM-900-HP-II) operates in the same band as the transmitter module 33 (902–928 MHz), separated into 8 selectable channels.

An analog circuit, a digital circuit, or a computer 38, with input-output capability and standard peripherals, processes the data received from RF receiver module 36 and other various switches (such as emergency stop and start pushbuttons), and generates command signals for actuator 28 that rotates turntable 22. One skilled in the art would know of any number of analog or digital circuits that could process the data as an alternative to computer 38. There are many control algorithms that generate command signals as a function of operator contact force. Using the measurement of the operator contact force, computer 38 calculates the amount of rotation necessary to create enough mechanical strength to assist the operator in the moving task. Refer to allowed patent application Ser. No. 09/443,478 for more details on various control algorithms applicable to the invention described here.

Power amplifier 40 allows the transfer of power to actuator 28 of turntable 22 as a function of the command signals from computer 38. If turntable 22 is powered electrically, a power amplifier 40 (e.g., PWM amplifier or proportional amplifier which receives a constant-voltage electric power from a power supply) is used. Power amplifier 40 delivers the proper amount of power to actuator 28 based on the command signals computed within computer 38. Arrow 41 of FIG. 6 represents the constant voltage to power amplifier 40 from an external power source and arrow 42 represents the modulated power delivered to actuator 28 from power amplifier 40.

If turntable 22 is powered pneumatically or hydraulically, a pneumatic or a hydraulic servo-valve, which receives pressurized air or fluid from a compressor, is used instead of power amplifier 40. This pneumatic or hydraulic servo-valve delivers the proper amount of pressurized air or fluid to the actuator based on the command signals computed within computer 38.

Finally, logic circuitry 43, composed of electromechanical or solid state relays, start and stop the system depending on a sequence of possible events. For example, the relays are used to start and stop the entire system operation using two push buttons installed either on the controller, on the instrumented glove or somewhere in the vicinity and reach of the operator. The relays also engage a friction brake in the event of power failure or when the operator leaves the system. As would be apparent to one skilled in the art, many alternatives are available for a logic circuit to create safe start-stop operation for the system.

Figure 7A:
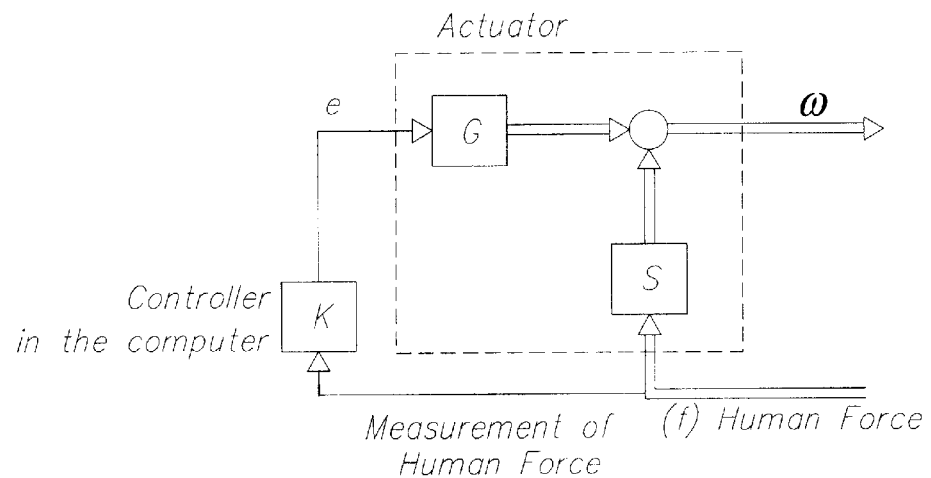
FIGS. 7A and 7B are block diagrams of the control system of the present invention.

The control system for rotating the turntable using the present invention is shown on FIG. 7A. The angular velocity of the turntable ($\omega$) is a function of the command signal generated by computer 38 and the human operator force imposed on cable car 20. This can be demonstrated by the following equation:

$$\omega = Ge + Sf \quad (1)$$

where (G) is the turntable transfer function which relates the command signal (e) generated by the computer to the angular velocity of the turntable ($\omega$), and (S) is the turntable sensitivity transfer function which relates the human force (f) to the turntable velocity ($\omega$). A positive value for ($\omega$) means clockwise rotation of the turntable. Equation (1) shows that in addition to the command signal (e) from computer 38, human force (f) that human operator 24 imposes on turntable 22 will also affect the turntable speed. If a closed loop velocity controller is designed for turntable 22 such that (S) is small, turntable 22 has only a small response to the force human operator 24 imposes onto turntable 22. A high-gain controller in the closed-loop velocity system results in a small (S) and consequently a small change in velocity, ($\omega$), in response to the human force (f).

Also note that non-back drivable speed reducers (usually with high transmission ratios) produce a small (S) for the system.

Human force, (f), is measured and transmitted to computer 38 as described above. If a control algorithm is represented by (K), then the output of the controller (e) is:

$$e = K(f) \quad (2)$$

Substituting for (e) from equation (2) into equation (1) results in the following equation for the turntable velocity ($\omega$):

$$\omega = GK(f) + Sf \quad (3)$$

Equation (3) shows that the more force imposed on turntable 22 by operator 24, the larger the velocity of the turntable. Using the measurement of the operator force, the controller calculates the actuator speed properly to create enough mechanical strength to assist the operator in the rotating task. In this way, turntable 22 follows operator 24 in a "natural" way. In other words operator 24 is able to rotate turntable 22 more easily without the use of any intermediary device.

Figure 7B:
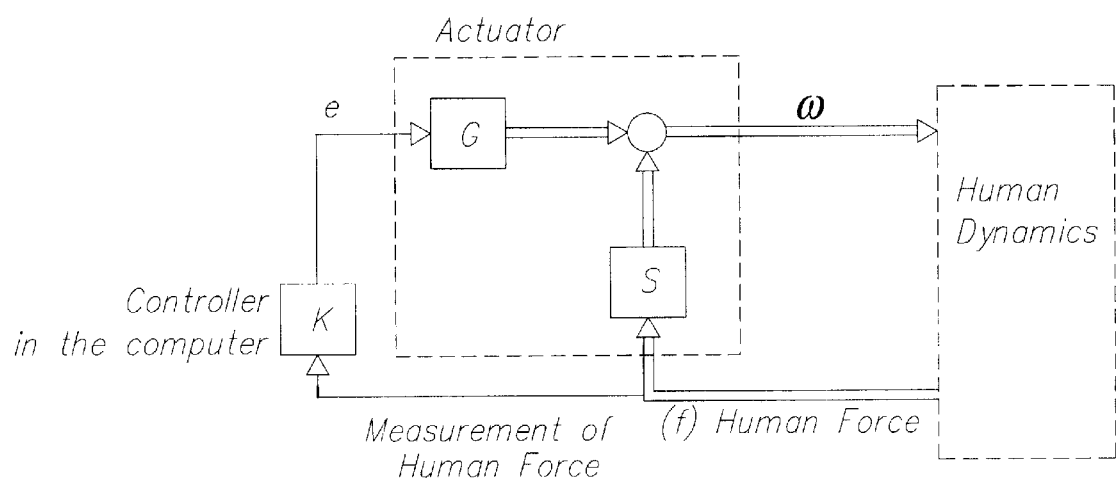

As shown in FIG. 7B, human force (f) is a function of human arm dynamics. As FIG. 7B indicates, (K) may not be arbitrarily large. Rather, the choice of (K) must guarantee the closed-loop stability of the system shown in FIG. 7B. It would be apparent to one skilled in the art, that there are many methods to design the controller (K). An article entitled "A Case Study on Dynamics of Haptic Devices: Human Induced Instability in Powered Hand Controllers," by Kazerooni and Snyder, published in AIAA Journal of Guidance, Control, and Dynamics, Vol. 18, No. 1, 1995, pp. 108–113, incorporated herein by reference, describes the conditions for the closed loop stability of the system. One skilled in the art is not confined to one choice of controller. A simple low pass filter acting as a controller, in many cases, is adequate to stabilize the system of FIG. 7B. Some choices of linear or non-linear controllers may lead to a better overall performance (large force amplification and high speed of operation) in the presence of variation of human arm dynamics.

The choice of (K) also depends on the available computational power; elaborate control algorithms to stabilize the closed system of FIG. 7B while yielding large force amplification with high speed of maneuvers might require a fast computer and large memory size. An article entitled "Human Extenders," by H. Kazerooni and J. Guo, published in ASME Journal of Dynamic Systems, Measurements, and Control, Vol. 115, No. 2(B), June 1993, pp. 281–289, incorporated herein by reference, describes stability of the closed loop system and a method of designing (K).

Theoretical values of (G) and (S) are available using standard modeling techniques. There are many experimental frequency-domain and time-domain methods in measuring S and G which yield superior results. In the preferred embodiment, a frequency-domain technique is used in identifying (G) and (S). For example, the book titled "Feedback Control of Dynamic Systems," by G. Franklin, D. Powell and A. Emami-Naeini, Addison Wesley, 1991 describes in detail the frequency-domain and time-domain methods for identifying various transfer functions.

The cable car rotation assistance application discussed above is just one exemplary embodiment of the present invention. The wireless material handing device and method of the present invention may also be used to help operators move various other objects with little human force.

Consequently, the various applications of the present invention reduce the manual efforts required by operators and provide a simplified, more versatile material handling device and method.

Figure 8:
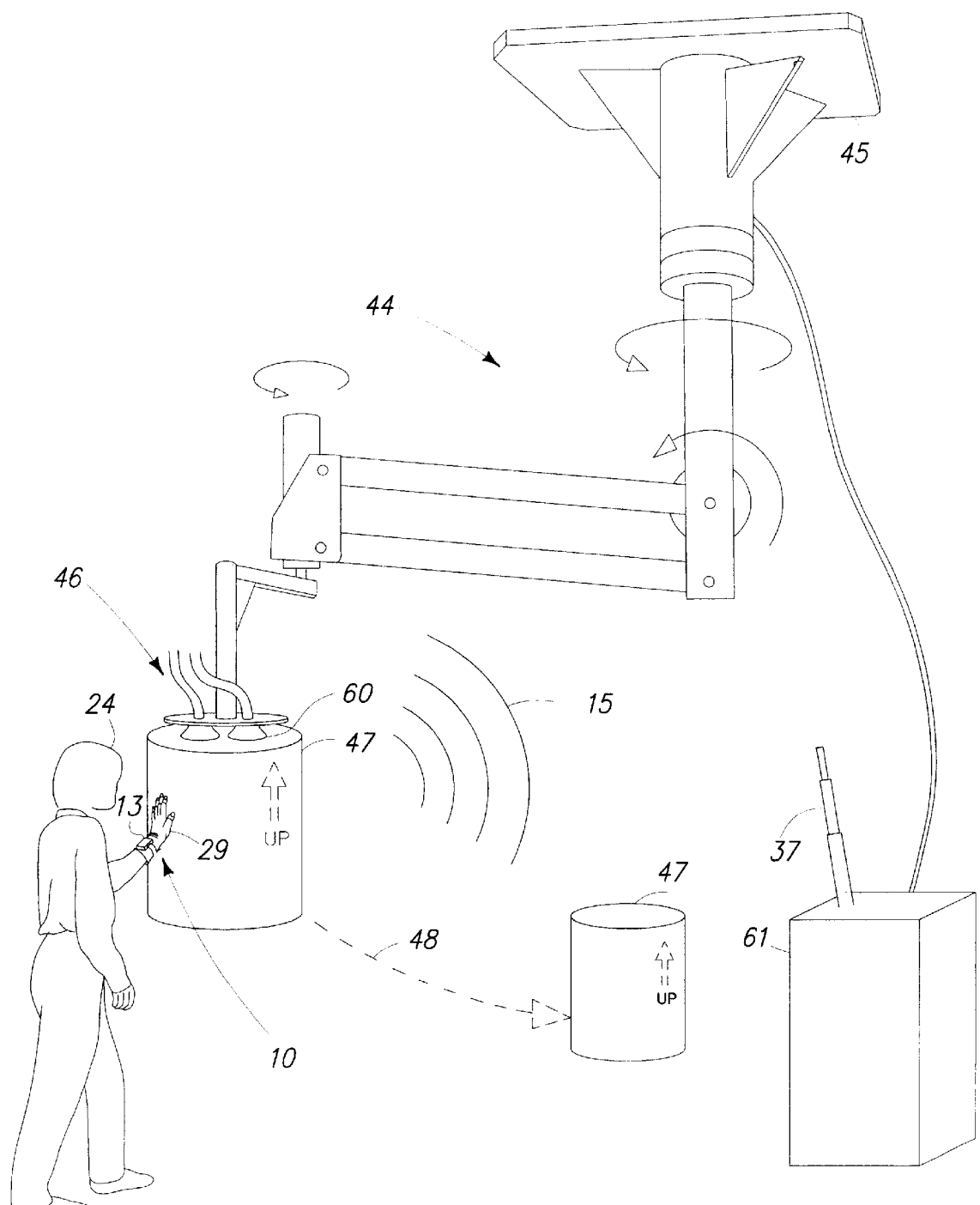
FIG. 8 illustrates another embodiment of the present invention used with a material handling device.

As shown in FIG. 8, another application of the present invention is to control a material handling manipulator 44 that is hung from the ceiling or from an overhead crane 45. Attached to the end point of the manipulator is an end-effector 46 which attaches load 47 to manipulator 44. In the embodiment of FIG. 8, end-effector 46 contains two suction cups 60. As would be apparent to one skilled in the art, many forms of grippers to connect load 47 to end-effector 46 are available in addition to suction cups 60. In general, the design of end-effector 46 depends on the geometry and weight of load 47 and how the user wants to connect a load to a particular material-handling device.

Instrumented glove 10 worn by human operator 24 senses the compressive force that the operator applies to load 47 or on material handling manipulator 44. As described above, transmitter circuitry 13 transmits a set of control signals, in the form of RF waves 15, representing the measured operator force on any object operator 24 is contacting. Manipulator controller 61 receives RF waves 15 from transmitter circuitry 13. Similar to turntable controller 27, manipulator controller 61 comprises several major components including receiver circuitry 16. Using the transmitted RF waves 15 from transmitter circuitry 13, manipulator controller 61 powers the actuators of material handling manipulator 44 appropriately such that enough mechanical strength is created to assist operator 24 in the required moving task. Therefore, when operator 24 pushes load 47, material handling manipulator 44 moves load 47 with an electromechanical force proportional to the actual human force exerted by the operator on the object.

However, the contact signals generated by the instrumented glove of the present invention does not specify which direction human operator 24 is pushing on material handling manipulator 44. In the exemplary embodiment of the present invention, the path for material handling manipulator 44 is programmed in manipulator controller 61.

For example, as shown in FIG. 8, material handling manipulator 44 is programmed to travel through trajectory 48, e.g., the programmed path may be designed to bring load 47 from its current location into a car in an auto assembly plant. As operator 24 pushes on load 47, material handling manipulator 44 travels through trajectory 48. The more operator 24 pushes on load 47, the faster material handling manipulator 44 travels through trajectory 48.

Material handling manipulator 44 follows the particular programmed trajectory regardless of the exact direction in which operator 24 pushes against load 47. Thus, material handling manipulator 44 brings load 47 to its final destination, moving load 47 along a pre-programmed trajectory with a speed that is proportional to the magnitude (but not the exact direction) of the operator's force on load 47 or on material handling manipulator 44. Therefore, even when the operator is paying little attention to trajectory 48 or to the final destination of load 47, material handling manipulator 44 will still bring load 47 to the proper final destination. Once load 47 is delivered to its final destination, material handling manipulator 44 will return to its original location.

The present invention is not limited to the embodiments and applications discussed above. For example, while a strain gage force-sensing device 18 was described above, one skilled in the art would know of other force measuring systems such as piezoelectric force sensor that can be used in the instrumented glove to measure the operator force. A piezoelectric force sensor produces electric charges when a force is applied to it. The generated electrical charges are then transformed to voltage via a charge amplifier for measurement. The fundamental difference between these devices and strain gage based force detection devices is that the electrical charges generated by the crystal decays rapidly after the application of force. This makes piezoelectric sensors unsuitable for the detection of static force. Kistler is an example of a company that has been manufacturing variety of strain gage sensors for many years.

Rather than generating contact signals representing the contact force magnitude, in some applications one might be interested in a sensory system that generates a binary signal; one signal when the contact force is zero and another signal when the contact force is not zero. In such cases the sensory system of the instrumented glove will be instrumented by a momentary switch rather than a force sensor. When the operator pushes against an object, the momentary switch is pressed and a set contact signals will be sent to transmitter circuitry representing a non-zero contact force. When the operator is not pushing against any object, the momentary switch is not pressed and either a different set of contact signals representing zero contact force will be sent to transmitter circuitry or no contact signal will be sent to transmitter circuitry. A momentary switch is defined here as a switch that shorts (or opens) a circuit as long as the switch is held pressed. When the momentary switch is not pressed, the embedded spring of the switch brings the switch back to its normally open position (or normally closed).

Figure 9:
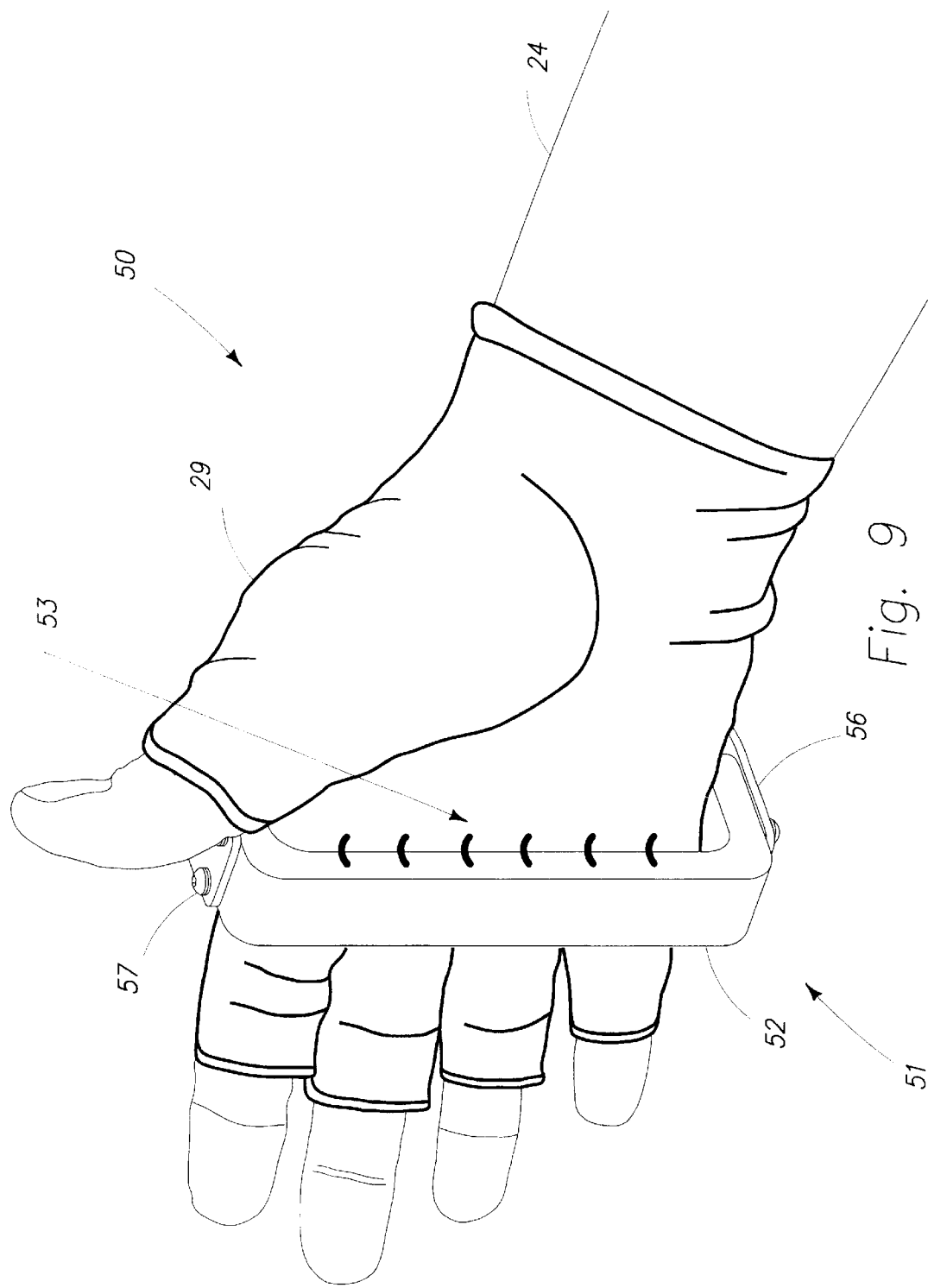
FIG. 9 is an isometric view of another embodiment of the instrumented glove of the present invention.
Figure 10A:
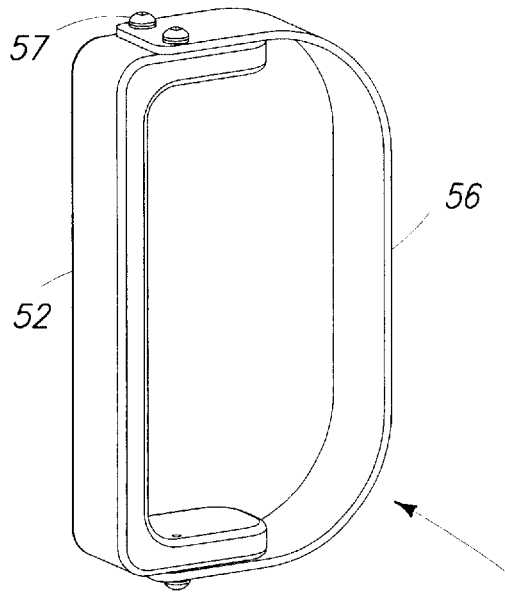
FIGS. 10A, 10B, and 10C illustrate the sensory system of the embodiment of the instrumented glove of FIG. 9.
Figure 10B:
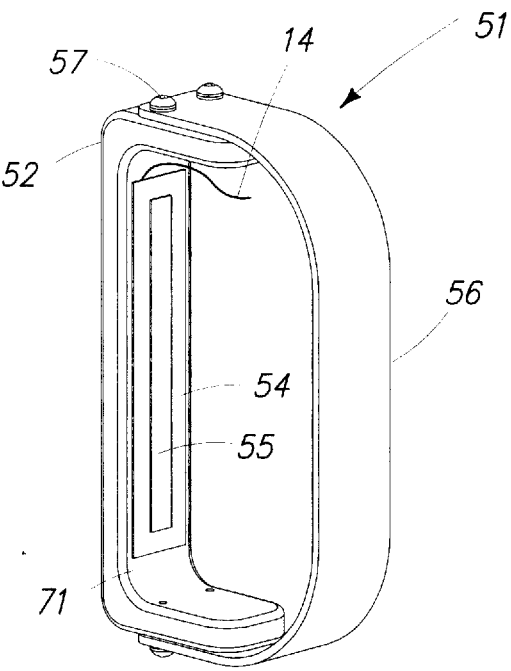
Figure 10C:
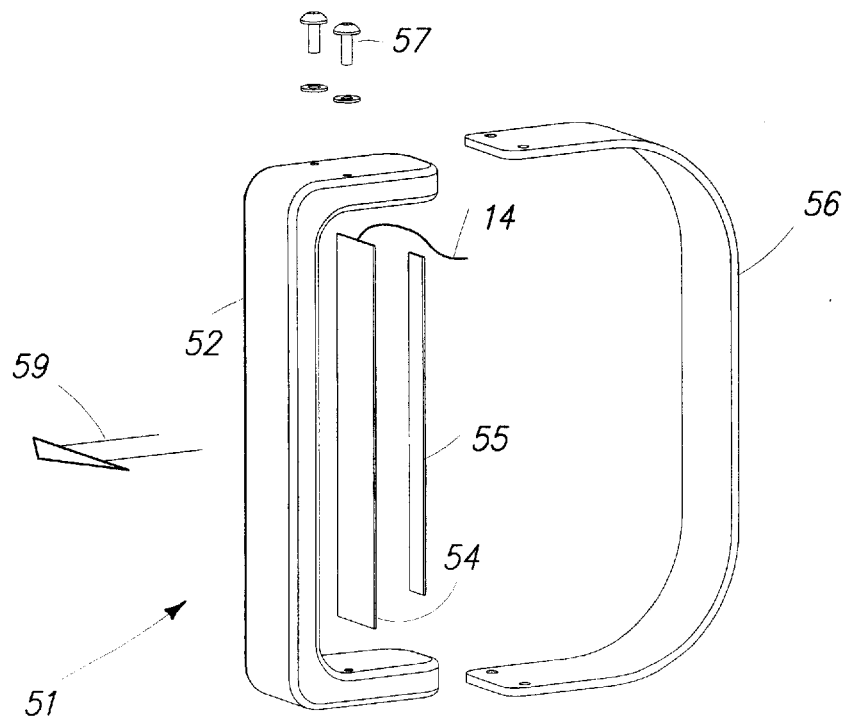

FIG. 9 shows an embodiment of instrumented glove 50 where a force sensing resistor is used to measure the operator force. In this embodiment, sensory system 51 comprises a C-shape bracket 52 connected to glove 29 by glue or other fastening means. In the exemplary embodiment shown in FIG. 9, C-shape bracket 52 was sewn to glove 29 at locations 53. C-shape bracket 52 creates a solid surface on which the operator can push. FIGS. 10A and 10B show two views of sensory system 51. Force-sensing resistor 54 is installed on the inner side of C-shape bracket 52 on surface 71 (shown in FIG. 10B). A thin layer of rubber 55 is glued on force-sensing resistor 54 which concentrates the operator force on force-sensing resistor 54. Signal cable 14 is used to connect force-sensing resistor 54 to micro-controller 31. FIG. 10C shows an exploded view of sensory system 51. Holding bracket 56 is connected to C-shape bracket 52 via fasteners 57. The function of holding bracket 56 is two fold; holding bracket 56 adds structural rigidity to C-shape bracket 52 and also creates a platform to hold a housing for transmitter circuitry 13.

Figure 11A:
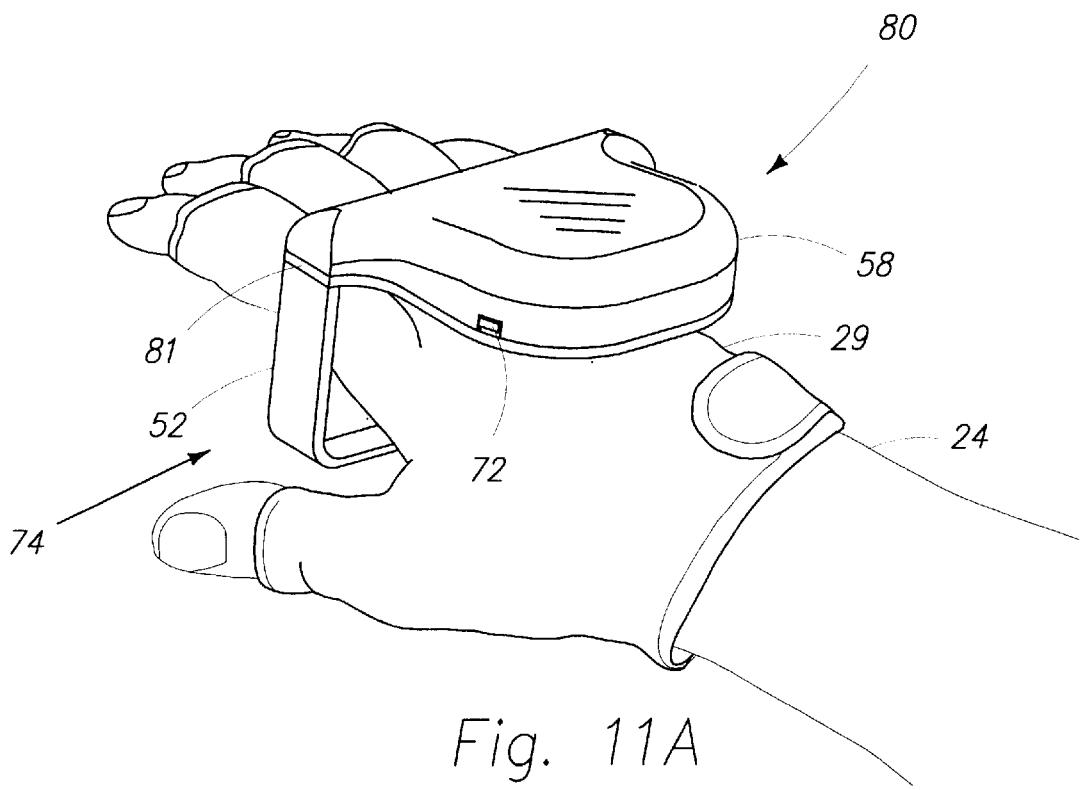
FIGS. 11A and 11B are isometric views of the embodiment of the instrumented glove of FIG. 9, wherein the sensory system includes a housing for the transmitter circuitry.
Figure 11B:
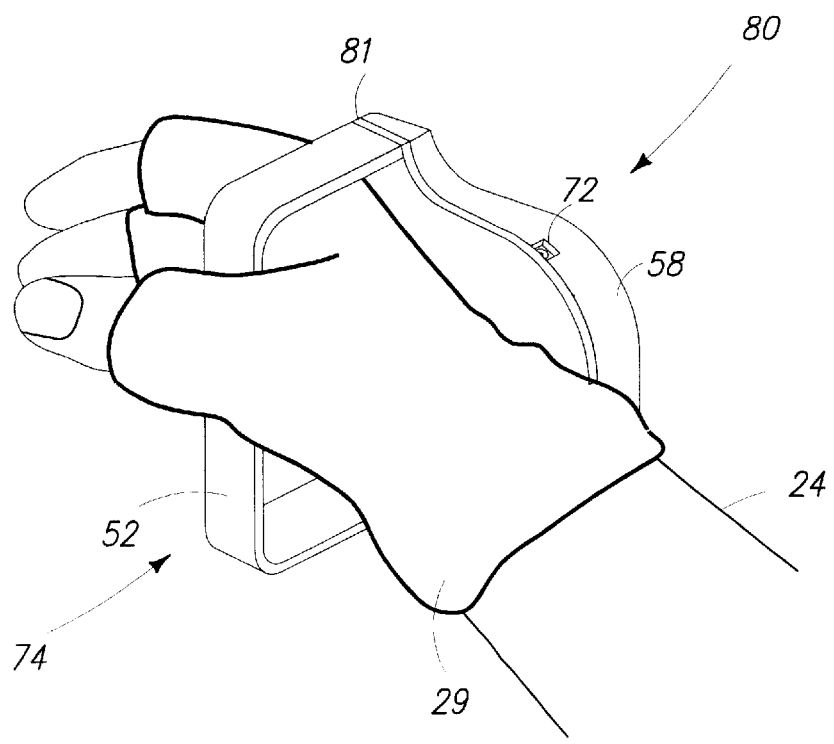

FIGS. 11A and 11B show views of yet another embodiment of instrumented glove 80 where holding bracket 56 is replaced with a planar holding bracket 81 to create a platform for transmitter circuitry 13. Transmitter circuitry 13 and a battery are connected to planar holding bracket 81 creating a compact instrumented glove. Cover bracket 58 is connected to planar holding bracket 81 via fasteners and protects transmitter circuitry 13.

Figure 12:
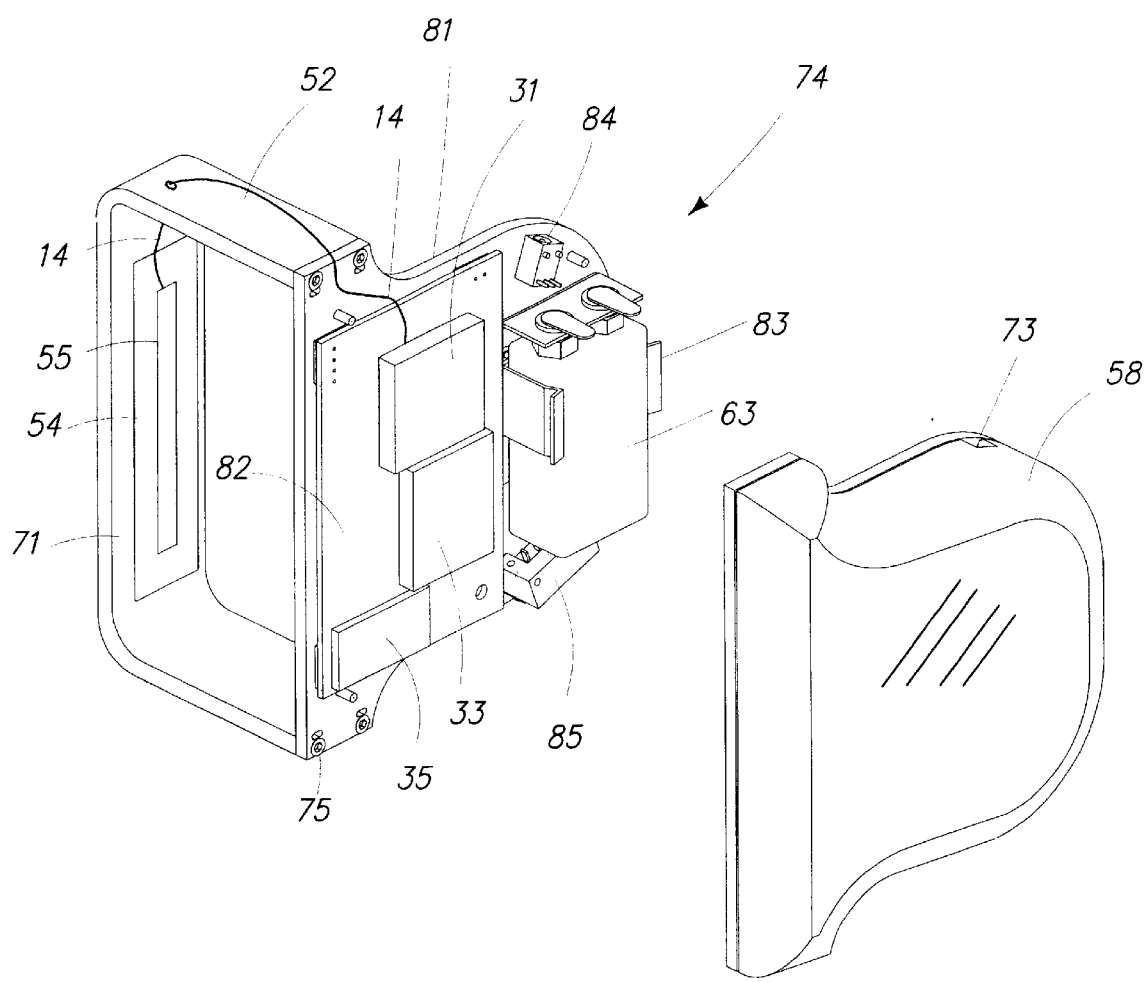
FIG. 12 is an exploded view of the housing and transmitter circuitry of FIGS. 11A and 11B.

FIG. 12 is an exploded view of sensory system 74 of instrumented glove 80 where glove 29 is removed. Planer holding bracket 81 is connected to C-shape bracket 52 via fasteners 75. Printed circuit board 82, connected to planar holding bracket 81 by means of standard fasteners, holds all the components of transmitter circuitry 13 including RF transmitter module 33, micro-controller 31 and transmitting antenna 35. 9-volt battery 63 is held by battery holder 83 and powers all components of transmitter circuitry 13. Force-sensing resistor 54 is installed on the inner side of C-shape bracket 52 on surface 71. A thin layer of rubber 55 is glued on force-sensing resistor 54 which concentrates the operator force on force-sensing resistor 54. Signal cable 14 is used to connect force-sensing resistor 54 to micro-controller 31. Signal cable 14 is shown in FIG. 12 as a loose wire to demonstrate its functionality, but it is apparent to those skilled in the art that there are many methods of routing and harnessing signal cable 14 for its protection against accidental damages. Plug 84 is installed on planar holding bracket 81 which can be used to recharge battery 63. On-off switch 85 is also installed on planar holding bracket 81 to disconnect power from the circuit. When the switch is in the off position the instrumented glove will not transmit any signal.

Many non-metallic materials and designs are available to one skilled in the art for cover bracket 58. Cover bracket 58 must dissipate the heat generated by transmitter circuitry 13 while preventing penetration of dust, dirt or water. Two holes are present on cover bracket 58. Hole 72 (shown in FIGS. 11A and 11B) is for accessing on-off switch 85 and hole 73 (shown in FIG. 12) is for accessing recharge plug 84. When C-shape bracket 52 is pushed along arrow direction 59 (shown in FIG. 1C), force-sensing resistor 54 measures the compression force that C-Shape bracket 52 imposes on an object. Since C-shape bracket 52 is in firm contact with the object, the force measured by force-sensing-resistor 54 represents the force that is imposed on the object by C-shape bracket 52.

Figure 13:
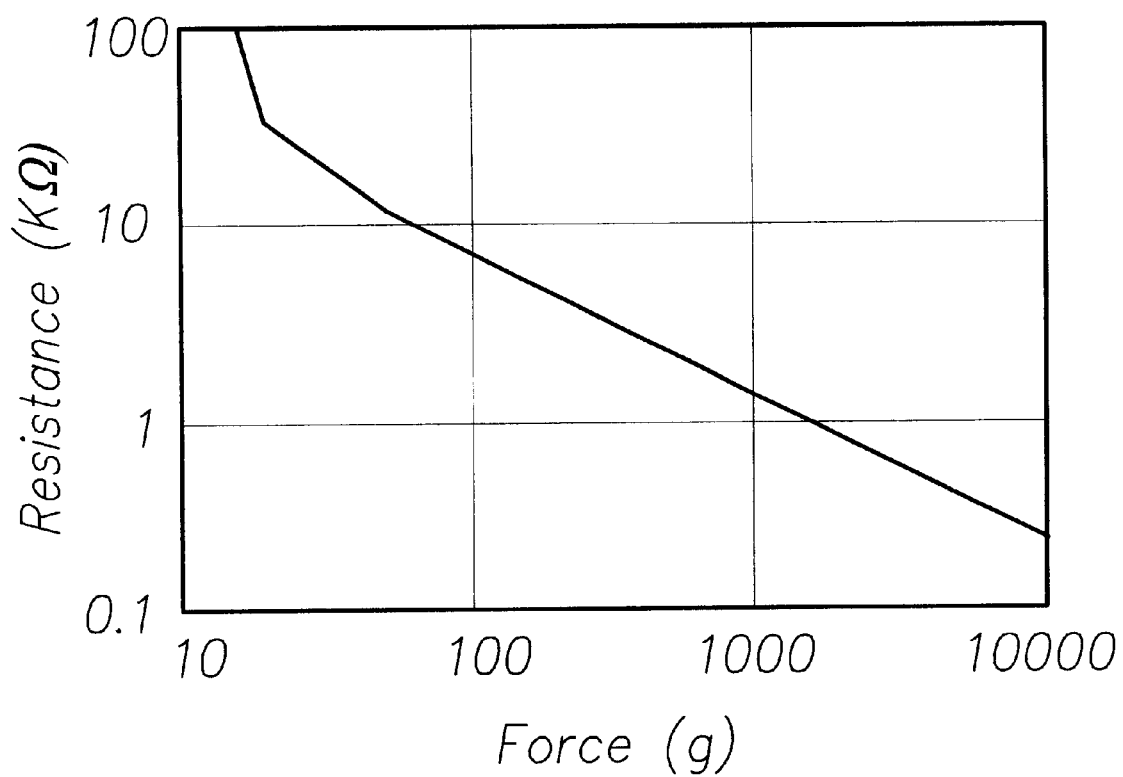
FIG. 13 illustrates the characteristics of a force-sensing resistor.

As their name implies, force-sensing resistors (FSR) use the electrical property of resistance to measure the force (or pressure) applied to a sensor. The force-sensing resistor is a polymer thick film (PTF) device, which exhibits a decrease in resistance with any increase in force applied to the active surface. The resistive material serves to make an electrical path between the two sets of conductors. Over a wide range of forces, as more force is applied to the sensor, the smaller the resistance of the sensor will become and therefore the sensor conductivity is a function of force on the sensor. With a typical FSR sensor, a human finger applying a force from 0.1N to 10N will cause the sensor to change resistance continuously from above 1MΩ to around 2KΩ. FIG. 13 shows the FSR force vs. resistance typical response behavior. For interpretational convenience, the force vs. resistance data is plotted on a log/log format. At the low force end, a switch-like response is evident. This threshold, or "break force," swings the resistance from greater than 1MΩ to about 50Ω–100Ω (the beginning of the power-law). At the high force end of the dynamic range, the response deviates from the power-law behavior, and eventually saturates to a point where increases in force yield little or no decrease in resistance.

Figure 14:
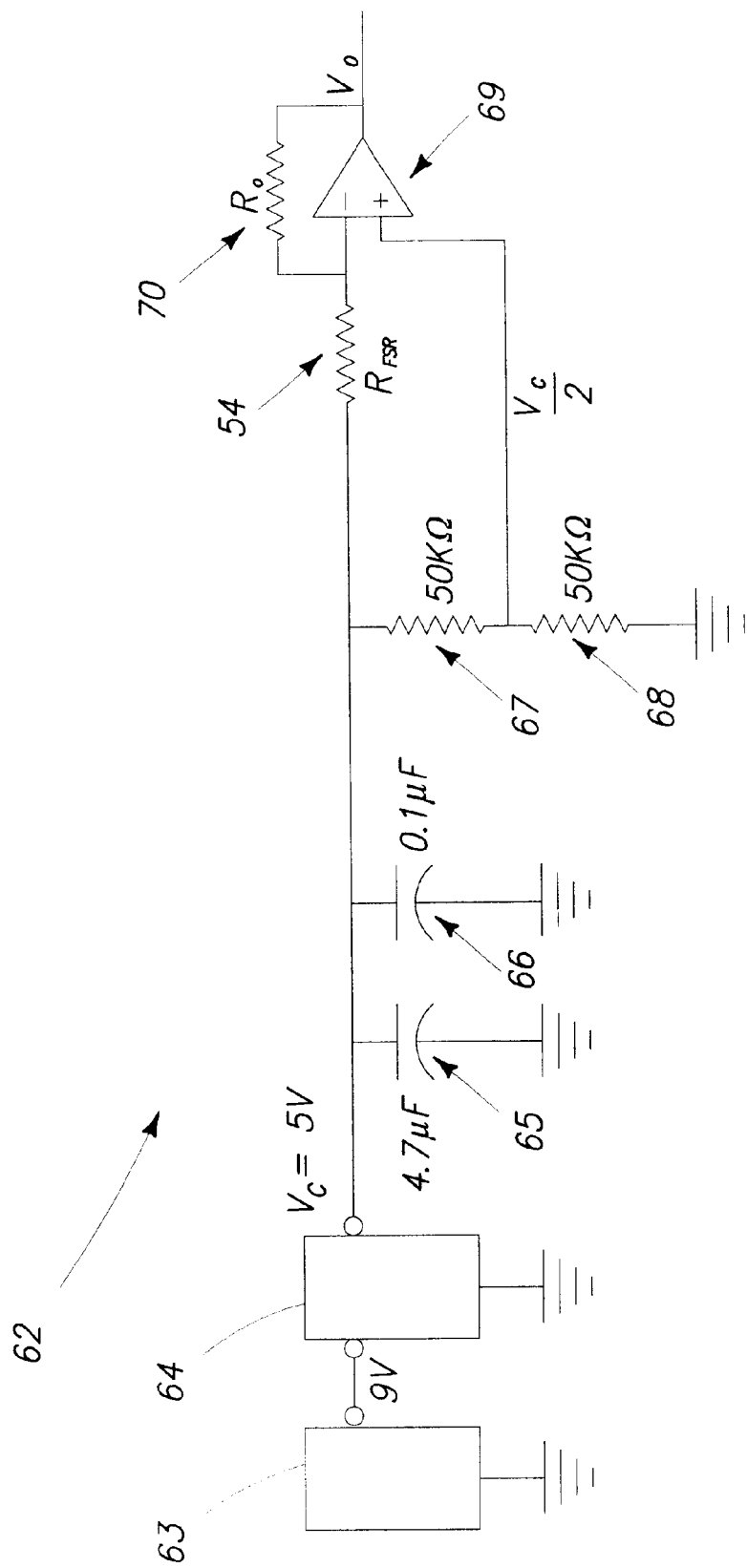
FIG. 14 is a schematic for a force-sensing resistor conditioning system.

FIG. 14 shows conditioning circuitry 62 needed to utilize force-sensing resistor 54. As shown in FIG. 14, a 9-volt battery is used to provide power for transmitter circuitry 13 and force-sensing resistor 54. Voltage regulator 64 is used to generate a five-volt source (shown by $V_C$ in FIG. 14). Two capacitors 65 and 66 are used to smooth the regulator output signal. Two 50Ω resistors 67 and 68 are used to create $V_C/2$. The use of operational amplifier 69 and feedback resistor 70 generates an output voltage $V_O$ such that:

$$V_O = \frac{V_O}{2}\left[1 - \frac{R_O}{R_{FSR}}\right] \quad (4)$$

where $R_{FSR}$ and $R_O$ are the resistances of force-sensing resistor 54 and feedback resistor 70 respectively. The output voltage, $V_O$, can then be read in micro-computer 31 located in transmitter circuitry 13. In the exemplary embodiment, a 1KΩ resistor is used for feedback resistor 70. When there is no force on the glove, $R_{FSR}$=100KΩ and therefore $V_O$=$V_C$/2. When the sensor is pressed down fully, $R_{FSR}$=1KΩ and $V_O$=0. This means the output voltage, $V_O$, decreases when force-sensing resistor 54 is pressed. In this embodiment the range of the output voltage is from 0 to $V_C/2$. One skilled in the art would know of other forms of force-sensing resistor conditioning circuits, which yield various output voltage ranges, that generate signals suitable to be read by the analog to digital converter of the micro-controller 31.

Figure 15:
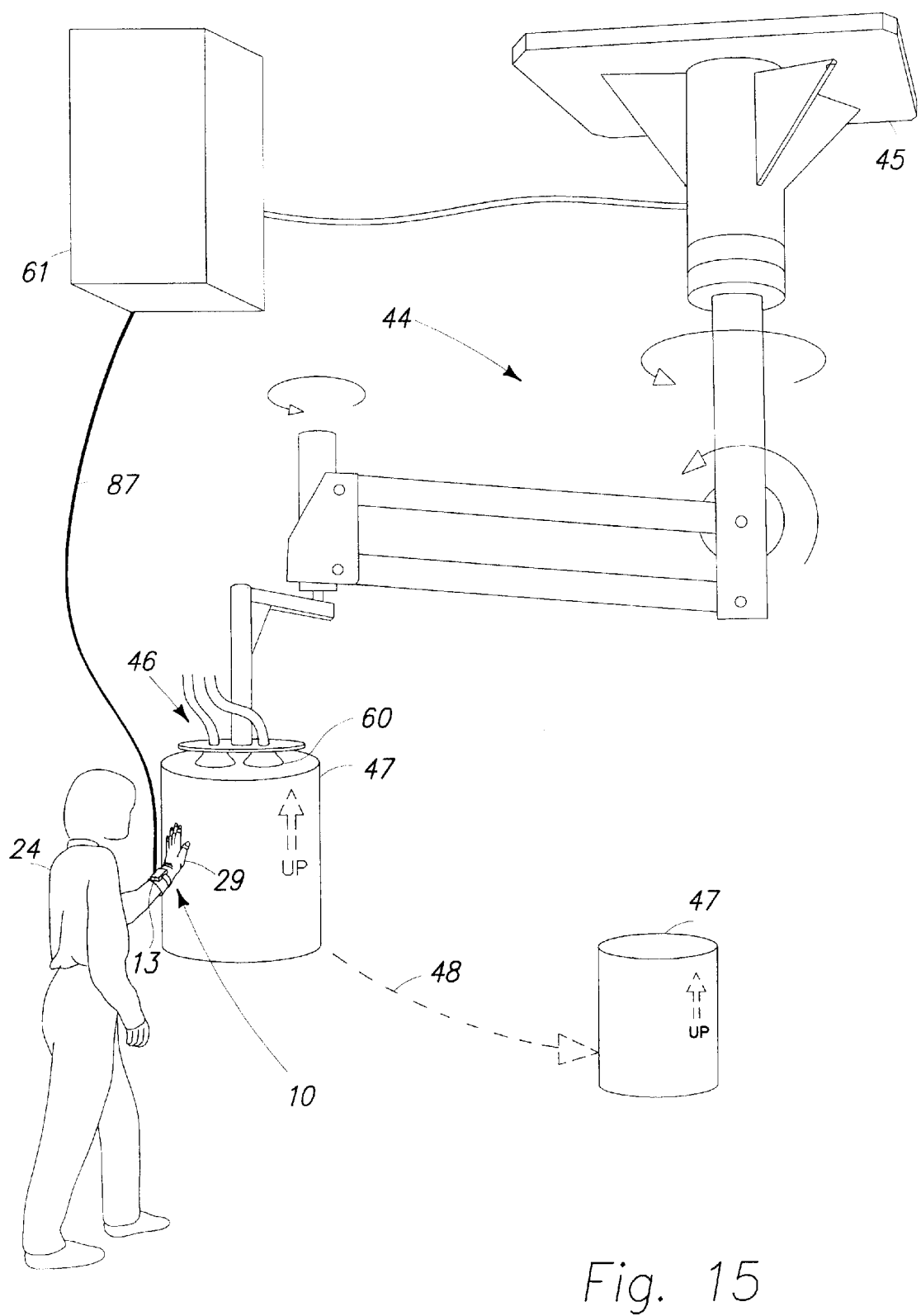
FIG. 15 illustrates another embodiment of the present invention where a signal cable is used to transmit a set of control signals.

The above describes examples of several preferred embodiments. Many other variations, which would be obvious to one skilled in the art, are possible. For example, in all embodiments described above, the control signals representing the human operator force are transmitted using 900 MHz radio frequency waves; other frequencies can equally be used for transmission of the control signals from transmitter circuitry 13. When hardware and costs justify, one could use Infrared (IR) signals for transmission of the control signals. Of course IR signals would be useful only when there is a direct line of sight between the transmitter and receiver. Infrared rays occupy that part of the electromagnetic spectrum with a frequency less than that of visible light and greater than that of most radio waves, although there is some overlap. In some special cases where wires and cables do not interfere with the operator motion, one could use a set of signal wires to transmit control signals that represent the human operator force. FIG. 15 shows a material handling manipulator 44 that is hung from the ceiling and a signal cable 87 is used to transmit control signals, representing the operator force, to controller 61.

Each and every patent, patent application and publication that is cited in the foregoing specification is herein incorporated by reference in its entirety. While the foregoing specification has been described with regard to certain preferred embodiments, and many details have been set forth for the purpose of illustration, it will be apparent to those skilled in the art that the invention may be subject to various modifications and additional embodiments, and that certain of the details described herein can be varied considerably without departing from the spirit and scope of the invention. Such modifications, equivalent variations and additional embodiments are also intended to fall within the scope of the appended claims.

What is claimed is:

1. A material handling device for maneuvering at least one object, among other components, comprising:
   at least one actuator to cause said material handling device to move;
   an instrumented glove wearable by a human hand, wherein said instrumented glove detects a contact force imposed by said human hand on said object or a part of said material handling device, and generates a set of contact signals representing said contact force;
   at least one transmitter circuitry capable of transmitting a set of control signals representing said contact signals; and
   employing said control signals to control said actuator to move said object through a trajectory wherein said human contact force is less than a human force that would be required to move said object through said trajectory without the aid of said material handling device.

2. The material handling device according to claim 1 wherein said transmitter circuitry transmits said control signals wirelessly by an electromagnetic field.

3. The material handling device according to claim 1, wherein said transmitter circuitry transmits said control signals wirelessly in the form of RF waves.

4. The material handling device according to claim 1, wherein said transmitter circuitry transmits said control signals to said controller by a signal cable.

5. The material handling device according to claim 1, wherein said instrumented glove further comprises a strain gage based force sensing element.

6. The material handling device according to claim 1, wherein said instrumented glove further comprises a piezoelectric force sensing element.

7. The material handling device according to claim 1, wherein said instrumented glove further comprises at least one force-sensing resistor.

8. The material handling device according to claim 1, wherein said instrumented glove comprises at least one switch to detect said contact force imposed by said human hand on said object or a part of said material handling device.

9. The material handling device according to claim 1, wherein said transmitter circuitry comprises a micro-controller, a transmitter module, and a transmitting antenna.

10. The material handling device according to claim 9, wherein said micro-controller collects said contact signals from said instrumented glove and passes a set of information signals representing said contact signals to said transmitter module which transmits said control signals in the form of RF waves through said transmitting antenna.

11. The material handling device according to claim 1, wherein said controller comprises a receiver circuitry, a computer, and a power amplifier.

12. The material handling device according to claim 11, wherein said receiver circuitry comprises a receiver module and a receiving antenna, wherein said receiver module receives said control signals in the form of RF waves through said receiving antenna, and sends a set of data representing said control signals to said computer.

13. The material handling device according to claim 11, wherein said computer delivers command signals to said power amplifier, which transfers power to said actuator.

14. The material handling device according to claim 11, wherein said controller further includes a logic circuit comprising electromechanical or solid state relays to start and stop said material handling device.

15. The material handling device according to claim 1, wherein said controller comprises a receiver circuitry, a computer, and a pneumatic or hydraulic servo-valve.

16. The material handling device according to claim 15, wherein said receiver circuitry comprises a receiver module and a receiving antenna, wherein said receiver module receives said control signals in the form of RF waves through said receiving antenna, and sends a set of data representing said control signals to said computer.

17. The material handling device according to claim 15, wherein said computer delivers command signals to said pneumatic or hydraulic servo-valve, which delivers pressurized air or fluid to said actuator.

18. The material handling device according to claim 15, wherein said controller further includes a logic circuit comprising electromechanical or solid state relays to start and stop said material handling device.

19. The material handling device according to claim 1, wherein said actuator which causes movement of said material handling device includes an electric motor.

20. The material handling device according to claim 1, wherein said actuator which causes movement of said material handling device includes a clutch.

21. The material handling device according to claim 1, wherein said controller is programmed to move said material handling device through a predetermined trajectory.

22. A method of operating a material handling device, comprising the steps of:
   providing an instrumented glove wearable on a human operator's hand; pressing by said human operator wearing said instrumented glove on a part of said material handling device or an object being carried by said material handling device;
   sensing the contact force imposed by said human operator's hand on said material handling device or said object;
   transmitting a set of control signals representing said contact force from a transmitter circuitry;
   receiving said control signals through a receiver circuitry; and
   employing said control signals to control said actuator to move said material handling device and said object through a trajectory such that said human contact force is smaller than a human force that would be required to move said object through said trajectory without the aid of said material handling device.

23. The method according to claim 22, wherein said sensing step is accomplished by means of at least one strain gage based force sensing element.

24. The method according to claim 22, wherein said sensing step is accomplished by means of at least one piezoelectric force sensing element.

25. The method according to claim 22, wherein said sensing step is accomplished by means of at least one force sensing resistor.

26. The method according to claim 22, wherein said sensing step is accomplished by means of a plurality of force sensing resistors.

27. The method according to claim 22, wherein said transmitting step is accomplished by an electromagnetic field.

28. The method according to claim 22, wherein said transmitting step is accomplished in the form of transmitting a set of RF waves which represent said control signals.

29. The method according to claim 22, wherein said transmitting step further comprises:
   collecting said contact signals in a micro-controller;
   sending a set of information signals representing said contact signals to a transmitter module; and
   radiating a set of RF waves representing said control signals through a transmitting antenna.

30. The method according to claim 22, wherein said receiving step further comprises:
   receiving a set of RF waves in a receiver module representing said control signals through a receiving antenna; and
   sending a set of data representing said RF waves to said computer.

31. The method according to claim 22, wherein said controlling the speed and mechanical assistance of said actuator comprises:
   generating a set of command signals by a computer as a function of said control signals; and
   delivering said command signals from said computer to a power amplifier which transfers power to said actuator.

32. The method according to claim 22, wherein controlling the speed and mechanical assistance of said actuator comprises:

generating a set of command signals by a computer as a function of said control signals; and delivering said command signals from said computer to a pneumatic or hydraulic servo-valve which delivers pressurized air or fluid to said actuator.

33. The method according to claim 22, further comprising pre-programming said material handling device to travel through a predetermined trajectory.

34. A rotating table system for rotating at least one object, said rotating table system comprising:

at least one actuator to cause said rotating table system to turn;

an instrumented glove wearable by a human hand that detects a contact force imposed by said human hand on said object or a part of said rotating table system, and generates a set of contact signals representing said contact force;

at least one transmitter circuitry capable of transmitting a set of control signals representing said contact signals to other locations; and a controller to receive and process said control signals and to generate a set command signals to control said actuator to cause said rotating table system to move such that said actuator and rotating table system turn causing said object and said rotating table system to follow the operator hand motion.

35. The rotating table system according to claim 34, wherein said transmitter circuitry transmits said control signals wirelessly in the form of RF waves.

36. The rotating table system according to claim 34 wherein said transmitter circuitry transmits said control signals wirelessly by an electromagnetic field.

37. The rotating table system according to claim 34 wherein said transmitter circuitry transmits said control signals to said controller by a signal cable.

38. The rotating table system according to claim 34 wherein said object is a cable car.

39. The rotating table system according to claim 34 wherein said transmitter circuitry is installed on said instrumented glove.

* * * * *